S. CROFT.
COCOANUT GRATERS.
No. 181,914. Patented Sept. 5, 1876.
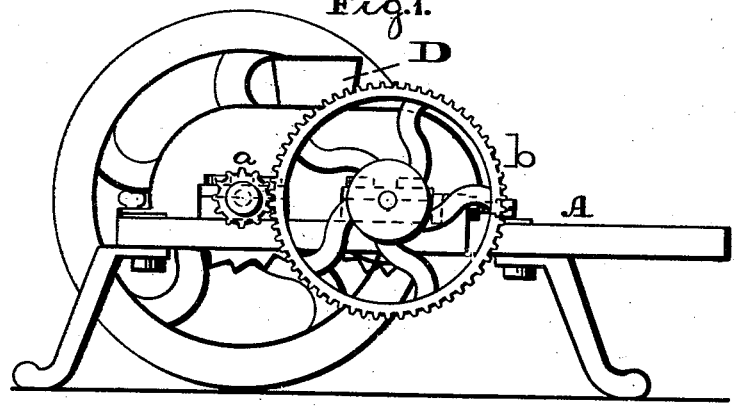
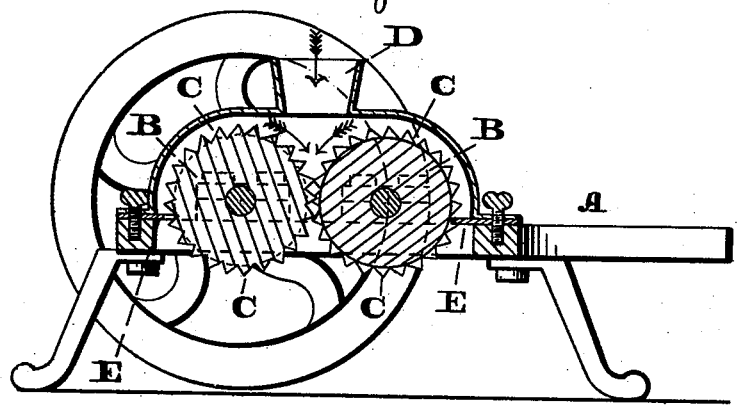
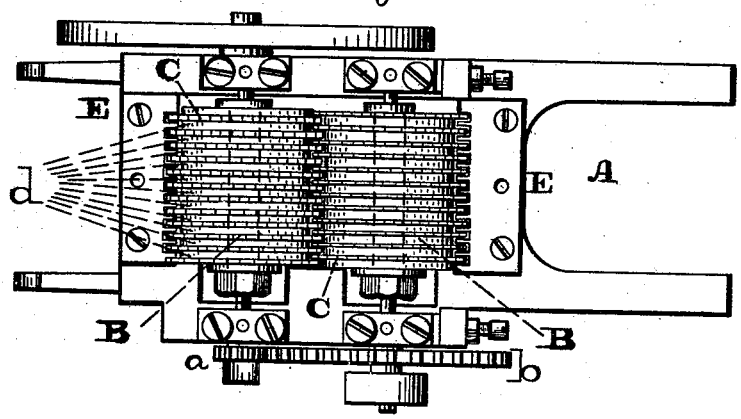
Witnesses:
Lewis F. Brown
A. P. Grant
Inventor:
Samuel Croft
by John A. Wiedersheim
Attorney.

UNITED STATES PATENT OFFICE.

SAMUEL CROFT, OF PHILADELPHIA, PENNSYLVANIA.

IMPROVEMENT IN COCOA-NUT GRATERS.

Specification forming part of Letters Patent No. 181,914, dated September 5, 1876; application filed May 25, 1876.

*To all whom it may concern:*

Be it known that I, SAMUEL CROFT, of the city and county of Philadelphia and State of Pennsylvania, have invented a new and useful Improvement in Cocoa-Nut Graters; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a side view of the apparatus embodying my invention. Fig. 2 is a central longitudinal vertical section thereof. Fig. 3 is a top or plan view thereof, the hopper being removed.

Similar letters of reference indicate corresponding parts in the several figures.

My invention consists of two similar cylinders or drums, the surfaces of which are formed at intervals with serrations, the serrations of each cylinder projecting into the intervening spaces of the other cylinder, each cylinder acting both as a feeder and grater. It also consists of two similar feeding and grating cylinders or drums rotated at different degrees of speed.

Referring to the drawings, A represents a frame, on which are mounted two cylinders or drums, B B, the axes of which carry gear-wheels $a$ $b$, which are of different diameters, so that the cylinders will rotate at different degrees of speed. The surface of each cylinder is formed with serrations C C, preferably of triangular or saw-tooth form, and these teeth are separated from each other, so that between each row, in the circular direction, there exists a space, $d$. In the present case a series of toothed disks and alternating washers is fitted on the shaft or axis of each cylinder, the teeth of the disks projecting beyond the periphery of the washers. The teeth of one cylinder project toward those of the other cylinder, and the two cylinders will be arranged adjacent to each other, with the teeth of each cylinder projecting into intervening spaces of the opposite cylinder. The cylinders rotate toward each other.

It will be seen that as the nut is fed to the cylinders through the hopper D it comes in contact with the cylinders above the point where the teeth pass through the spaces $d$, and is drawn in toward and through said point, so as to be subjected to the cutting and grating action of the teeth C. Now, as one cylinder revolves with greater velocity or describes more revolutions than the other, it is evident that the teeth of one cylinder pass the teeth of the other with corresponding velocity, so that the cutting of the nut is accomplished with certainty and ease, and the crushing of the nut is avoided. By this provision, also, the teeth, to a certain extent, clear each other of pieces of the nut that have a tendency to adhere thereto. On opposite sides of the frame, at points adjacent to the cylinder B, I arrange toothed plates E, the teeth of which mesh with the teeth of the cylinders, so as to effectually clear the cylinders of the fragments of the nut.

I am aware that it is not new to employ a feeding-roller and a crushing-cylinder in combination with a grating-plate; but such features are not shown by me. I employ two similar cylinders, each adapted to feed and grate, and rotate them at different speeds, so that the nut will be sliced or grated in shreds, instead of being crushed or pulped, as is accomplished by two dissimilar rollers or cylinders.

Having thus described my invention, what I claim as new, and desire to secure by Letters Patent, is—

1. The two cylinders B B, formed with teeth or serrations C C, with intervening spaces $d$, the teeth of each cylinder projecting into the intervening spaces of the opposite cylinder, both cylinders feeding and grating, substantially as and for the purpose set forth.

2. Two similar feeding and grating cylinders, B, rotating at different degrees of speed, substantially as and for the purpose set forth.

SAMUEL CROFT.

Witnesses:
JOHN A. WIEDERSHEIM,
JNO. A. BELL.